US012179926B2

(12) United States Patent
Trent et al.

(10) Patent No.: US 12,179,926 B2
(45) Date of Patent: Dec. 31, 2024

(54) METHODS AND SYSTEMS FOR DECONTAMINATING AIRCRAFT CABINS AND PROVIDING INDICATIONS FOR SAFE REENTRY

(71) Applicant: The Boeing Company, Chicago, IL (US)

(72) Inventors: Stephen M. Trent, Everett, WA (US); David R. Space, Everett, WA (US); Stephanie K. Licht, Everett, WA (US)

(73) Assignee: THE BOEING COMPANY, Arlington, VA (US)

( * ) Notice: Subject to any disclaimer, the term of this patent is extended or adjusted under 35 U.S.C. 154(b) by 591 days.

(21) Appl. No.: 17/349,224

(22) Filed: Jun. 16, 2021

(65) Prior Publication Data

US 2021/0394911 A1 Dec. 23, 2021

Related U.S. Application Data

(60) Provisional application No. 63/041,620, filed on Jun. 19, 2020.

(51) Int. Cl.
*B64D 13/08* (2006.01)
*B64D 13/06* (2006.01)
(Continued)

(52) U.S. Cl.
CPC ............. *B64D 13/08* (2013.01); *B64D 13/06* (2013.01); *B64F 5/30* (2017.01); *B60H 3/0071* (2013.01);
(Continued)

(58) Field of Classification Search
CPC ................. B64D 13/08; B64D 13/06; B64D 2013/0651; B64D 2013/0688; B64D 2013/0603; B64F 5/30; F24F 2110/65
See application file for complete search history.

(56) References Cited

U.S. PATENT DOCUMENTS 4,742,761 A * 5/1988 Horstman .............. B64D 13/04
454/238
6,668,563 B2 * 12/2003 Mirowsky .............. B64D 13/00
361/231

(Continued)

FOREIGN PATENT DOCUMENTS

CN     106184767 A  * 12/2016  ............... A61L 2/06
CN     108355155 A  *  8/2018  ............... A61L 2/00

(Continued)

OTHER PUBLICATIONS

European Application Serial No. 21180338.2, Search Report dated Nov. 16, 2021, 7 pgs.

*Primary Examiner* — Stephen Hobson
(74) *Attorney, Agent, or Firm* — MH2 TECHNOLOGY LAW GROUP LLP

(57) ABSTRACT

Described herein are methods and systems for decontaminating aircraft cabins and providing an indication to provide confidence that the cabins are safe for reentry post-operation. These methods and systems are based on reducing concentrations of infectious agents inside a cabin utilizing outside air and/or filtered air. In some examples, a method is performed after a certain contamination event (e.g., a sick person present on a flight and/or as a part of periodic service (e.g., in between flights. The amount of time the system is run to introduce compounds into the cabin is specifically calculated to lower the fraction of the remaining infectious agents below a certain desired level, thereby reducing the contamination concentration in the cabin from the initial concentration. The decontamination duration depends on the cabin volume and the incoming airflow rates. For example, the fraction of the remaining is brought below 5% after 9 minutes of flowing incoming air at 20 air changes per hour.

20 Claims, 6 Drawing Sheets

(51) Int. Cl.
  *B64F 5/30*   (2017.01)
  *B60H 3/00*   (2006.01)
  *F24F 110/65*   (2018.01)

(52) U.S. Cl.
  CPC .............. *B64D 2013/0651* (2013.01); *B64D 2013/0688* (2013.01); *F24F 2110/65* (2018.01)

(56) References Cited

U.S. PATENT DOCUMENTS

| | | | | |
|---|---|---|---|---|
| 7,871,038 | B2 * | 1/2011 | Space | B64D 13/06 454/71 |
| 9,440,745 | B1 * | 9/2016 | Zhang | B64D 13/06 |
| 9,907,870 | B2 * | 3/2018 | Boodaghians | H10K 50/00 |
| 11,780,593 | B1 * | 10/2023 | Longe | B64D 13/08 454/71 |
| 2005/0051668 | A1 * | 3/2005 | Atkey | B64D 13/06 244/118.5 |
| 2005/0074359 | A1 * | 4/2005 | Krieger | A61L 2/208 422/292 |
| 2008/0283663 | A1 * | 11/2008 | Space | B64D 13/06 244/118.5 |
| 2009/0311138 | A1 * | 12/2009 | Klaptchuk | B60H 3/0071 422/30 |
| 2012/0264361 | A1 * | 10/2012 | Scheer | B60H 3/0035 454/75 |
| 2013/0327891 | A1 * | 12/2013 | Zhang | B64D 13/08 244/118.5 |
| 2014/0179212 | A1 * | 6/2014 | Space | B60N 2/5635 454/76 |
| 2018/0214823 | A1 * | 8/2018 | Faudry | B01D 53/76 |
| 2019/0100318 | A1 * | 4/2019 | Space | B01D 53/72 |
| 2019/0160190 | A1 * | 5/2019 | Kreitenberg | A61L 2/10 |
| 2021/0393840 | A1 * | 12/2021 | Maben | A61L 9/04 |
| 2022/0048633 | A1 * | 2/2022 | Michalakos | B64F 5/30 |
| 2022/0063816 | A1 * | 3/2022 | Haruki | B64D 13/006 |
| 2022/0118389 | A1 * | 4/2022 | Skelton | B60H 1/00371 |
| 2023/0373640 | A1 * | 11/2023 | Wiegers | B64D 13/08 |

FOREIGN PATENT DOCUMENTS

| | | | | |
|---|---|---|---|---|
| EP | 2777716 | A1 * | 9/2014 | ............ A61L 2/06 |
| EP | 3050801 | A1 | 8/2016 | |
| EP | 3050803 | A1 | 8/2016 | |
| JP | 2012066755 | A * | 4/2012 | |
| WO | 2016189420 | A1 | 12/2016 | |
| WO | WO-2018137003 | A2 * | 8/2018 | ............ A61L 9/015 |
| WO | WO-2019227237 | A1 * | 12/2019 | ............ B08B 13/00 |

\* cited by examiner

METHODS AND SYSTEMS FOR DECONTAMINATING AIRCRAFT CABINS AND PROVIDING INDICATIONS FOR SAFE REENTRY

CROSS-REFERENCE TO RELATED APPLICATIONS

This application claims the benefit under 35 U.S.C. § 119(e) of U.S. Provisional Patent Application 63/041,620, filed on 2020 Jun. 19, which is incorporated herein by reference in its entirety for all purposes.

BACKGROUND

Contaminants may be introduced or appear in various areas of an aircraft and other types of vehicles causing the areas to become unsuitable for further use. For example, with the growing popularity of air and other forms of travel and new destinations, the potential for transmission of infectious diseases has dramatically increased. Conventional decontamination processes can take significant amounts of time and may leave certain areas unattended.

SUMMARY

Described herein are methods and systems for decontaminating aircraft cabins and providing indications that the cabins are safe for reentry. These methods and systems are based on replacing the air inside aircraft cabins with outside air and/or filtered air. In some examples, a method is performed after a certain contamination event (e.g., a sick person is present on a flight) and/or as a part of periodic service (e.g., in between flights). The amount of air introduced into the cabin is specifically calculated to reduce the fraction of the remaining air below a certain desired level, thereby reducing the contamination concentration in the cabin. The decontamination duration depends on the cabin volume and the incoming airflow rates.

For example, the fraction of the remaining air is brought below 5% after 10 minutes at a flow rate of 20 air changes per hour.

DETAILED DESCRIPTION

Figure 1:
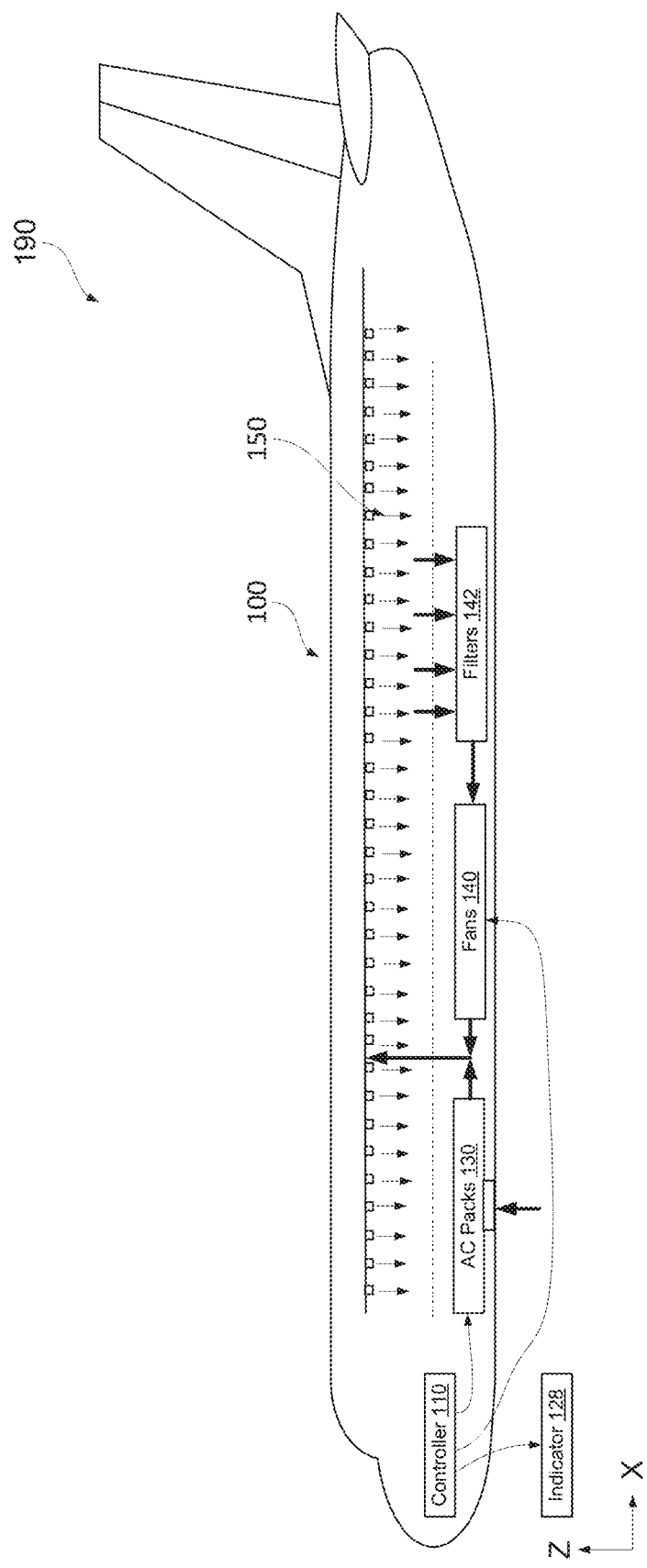
FIG. 1 is a schematic illustration of an aircraft, comprising a system for decontaminating an aircraft cabin and providing an indication that the aircraft cabin is safe for reentry, in accordance with some examples.

In the following description, numerous specific details are set forth in order to provide a thorough understanding of the presented concepts. In some examples, the presented concepts are practiced without some or all of these specific details. In other instances, well-known process operations have not been described in detail to not unnecessarily obscure the described concepts. While some concepts will be described in conjunction with the specific examples, it will be understood that these examples are not intended to be limiting.

Introduction

Described herein are systems and methods for decontaminating aircraft cabins and for external identification of the decontamination process completion (e.g., when the aircraft cabins are substantially free from infectious agents/diseases and are ready for reentry). In some examples, these systems and methods at least partially rely on existing environmental control systems (ECS) of aircraft, while providing new indication features to various users (e.g., airlines, flight crew, maintenance, ground crew).

For example, a decontamination system is activated when no people are present in the aircraft cabin and, in some examples, when the doors to the aircraft system are closed. A controller determines a required output of one or more air conditioning packs and/or of one or more fans to deliver air into the cabin, defining the total incoming flow rate. In some examples, this total incoming flow rate is presented in terms of air changes per hour, with 1 air change per hour representing a flow rate corresponding to a volume of the aircraft divided by an hour. It should be noted that when an incoming air is flown into the cabin, this incoming air displaces corresponding amounts of air, which is referred to as displaced air. Initially, the displaced air is primarily the air, which was present in the cabin before the system activation and which is referred to as original air. As the decontamination proceeds forward, the original air represents a smaller fraction of the displaced air since the ratio of the original air (to the total air) in the cabin decreases. This fraction is referred to as a remaining air fraction. The decontamination process proceeds until reaching a certain minimal level of the remaining air fraction by replacing the original air in the cabin. This minimal level of the remaining air fraction is selected, e.g., based on the type of contaminants, the likelihood of contamination, and other like factors.

The total incoming flow rate, the volume of the aircraft, and the desired level of the remaining air fraction are used by the controller to determine the duration of the decontamination process. In some examples, additional inputs (e.g., from one or more biosensors positioned in the aircraft cabin) to the controller are used to determine the duration (e.g., extend the decontamination process if the contaminants are still present above the allowable level).

Upon completion of the decontamination process, the controller provides input to an external indicator (e.g., positioned outside the cabin) that the decontamination process is completed and that the cabin is ready to enter. It should be noted that, in some examples, entering the aircraft cabin during the decontamination process interferes with the decontamination process (e.g., alters the air circulation) and/or potentially unsafe to entering personnel (e.g., contaminants can be suspended in the air). In some examples, the external indicator is a light, positioned proximate to an aircraft door.

In some examples, the system is initiated and controlled manually. For example, a switch at a flight deck is used to start the decontamination process. In some examples, the system is initiated and controlled automatically. For example, a door sensor is used to initiate the process, e.g., upon detecting that all doors are closed. In some examples, a biosensor and/or other types of sensors are used to provide one or more inputs (e.g., the level of contaminants in the cabin) to the controller. Furthermore, in some examples, the biosensor checks the air of the newly cleaned/purged cabin to ensure that the timer and controller were effective in completely purging and cleaning the cabin air. In some examples, the controller is used to control the speed of the fans of the ECS system (e.g., ensuring a high flow rate through the cabin, thereby reducing the decontamination time). In some examples, variable-speed fans are used (instead of fixed-speed fans) to assist with the decontamination process and to achieve high flow rates.

Decontamination System Examples

Figure 2:
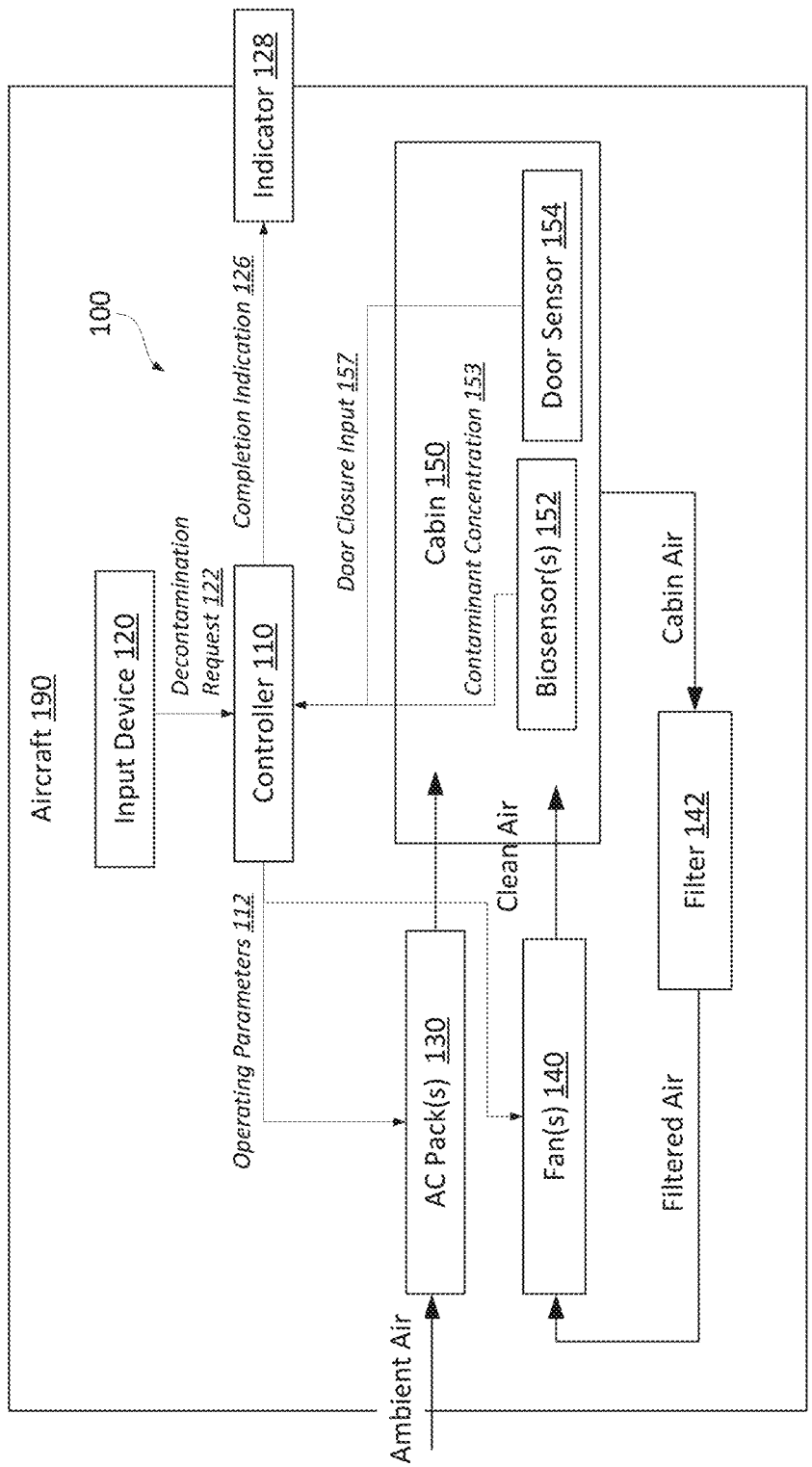
FIG. 2 is a block diagram of the aircraft in FIG. 1, illustrating various components of the system for decontaminating the aircraft cabin and providing an indication that the aircraft cabin is safe for reentry, in accordance with some examples.

FIG. 1 is a schematic illustration of aircraft 190, comprising system 100 for decontaminating aircraft cabin 150 and providing an indication that aircraft cabin 150 is safe for reentry, in accordance with some examples. FIG. 2 is a block diagram of aircraft 190 in FIG. 1, illustrating various components of the comprising system 100.

Referring to FIGS. 1 and 2, system 100 comprises one or more air conditioning packs 130, configured to receive ambient air from outside aircraft 190 and to supply ambient air into cabin 150 of aircraft 190. System 100 also comprises one or more filters 142 and one or more fans 140, configured to receive cabin air from cabin 150 of aircraft 190, to pass cabin air through one or more filters 142 thereby generating filtered air, and to supply filtered air into cabin 150. In some examples, one or more air conditioning packs 130, one or more fans 140, and one or more filters 142 are parts of the ECS of aircraft 190. In other words, one or more air conditioning packs 130, one or more fans 140, and one or more filters 142 are also used during other operations of aircraft 190, such as during the flight. As such, in some examples, decontamination system 100 is at least in part or fully integrated into the ECS of aircraft 190.

Referring to FIG. 2, system 100 also comprises controller 110, communicatively coupled to one or more air conditioning packs 130 and to one or more fans 140. System 100 is configured to receive decontamination request 122 and to determine operating parameters 112 of one or more air conditioning packs 130 and one or more fans 140 to perform the decontamination of aircraft cabin 150. Various types of operating parameters 112 are within the scope. For example, operating parameters 112 comprise the duration of operating one or more air conditioning packs 130 and one or more fans 140. In some examples, the duration of operating one or more air conditioning packs 130 is the same as the duration of operating one or more fans 140. Alternatively, the duration of operating one or more air conditioning packs 130 is different from the duration of operating one or more fans 140. For example, the duration of operating one or more air conditioning packs 130 is longer than the duration of operating one or more fans 140. In another example, the duration of operating one or more air conditioning packs 130 is shorter than the duration of operating one or more fans 140. In some examples, the periods of operating one or more air conditioning packs 130 and operating one or more fans 140 coincide (e.g., start and finish at the same time). Alternatively, the periods of operating one or more air conditioning packs 130 and operating one or more fans 140 are staggered (e.g., start and/or finish at different time, but the operating periods overlap). For example, the process starts with operating one or more air conditioning packs 130 only, while one or more fans 140 are turned on lately. Alternatively, the process starts with operating one or more fans 140 only, while one or more air conditioning packs 130 are turned on lately.

In some examples, the duration of operating one or more air conditioning packs 130 and one or more fans 140 is determined based on one or more of (a) the cabin volume, (b) a combined ventilation rate provided by one or more air conditioning packs 130 and one or more fans 140, and (c) an acceptable fraction of the remaining air in aircraft 190. This determination is further described below with reference to FIGS. 4 and 5. In general, a larger cabin volume requires longer decontamination and vice versa. A smaller combined ventilation rate requires longer decontamination and vice versa. A lower acceptable fraction of the remaining air requires longer decontamination and vice versa.

System 100 also comprises indicator 128, communicatively coupled to controller 110. Indicator 128 is configured to receive completion indication 126 from controller 110 and present completion indication 126 to people that aircraft 190 is safe for reentry. In some examples, completion indicator 128 is located outside of aircraft 190 and visible to the people outside aircraft 190. For example, completion indicator 123 is located on one or more of a jet bridge, a jet bay, or an airport gate. In some examples, completion indicator 128 comprises or is coupled to a wireless transmitter, e.g., to inform remote users and systems about the completion of the decontamination process. For example, the departing time of a flight is conditioned on the completion of the decontamination process.

In some examples, system 100 further comprises input device 120, communicatively coupled to controller 110 and configured to send decontamination request 122 to controller 110. For example, input device 120 is one of a flight deck switch or an attendant panel. However, other examples within the scope.

In some examples, system 100 further comprises one or more biosensors 152, positioned within cabin 150 of aircraft 190. One or more biosensors 152 are configured to measure the presence or, more specifically, the concentration of one or more contaminants in cabin 150. One or more biosensors 152 are communicatively coupled to controller 110 and configured to provide contamination concentration input 153 to controller 110. In these examples, controller 110 is configured to use contamination concentration input 153 to trigger the operation of one or more air conditioning packs 130 and one or more fans 140. For example, one or more biosensors 152 determined the concentration of a contaminant exceeding a certain threshold and informs controller 110 about the event. This part of the process is performed at any time. In some embodiments, one or more biosensors 152 continuously monitor contaminants in cabin 150. Upon receiving contamination concentration input 153 from one or more biosensors 152, controller 110 schedules a decontamination process, which may or may not occur immediately. For example, cabin 150 is still occupied when the contamination even was detected, in which case the decontamination process is scheduled for a future, e.g., when cabin 150 is free from occupants.

In some examples, controller 110 is configured to use contamination concentration input 153 to revise operating parameters 112 of one or more air conditioning packs 130 and one or more fans 140. For example, the initially determined duration of operating one or more air conditioning packs 130 and one or more fans 140 is revised based on contamination concentration input 153 (e.g., shortened if contamination concentration input 153 indicates a faster decay of the contaminant concentration, or lengthened if contamination concentration input 153 indicates a slower decay of the contaminant concentration).

In some examples, operating parameters 112 further comprise the operating output of each of one or more air conditioning packs 130 and each of one or more fans 140. It should be noted that a combined ventilation rate is based on the ventilation rate of one or more air conditioning packs 130 and the ventilation rate of each of one or more fans 140. In some examples, the ratio of the ventilation rate of one or more air conditioning packs 130 to the ventilation rate of each of one or more fans 140 is 50%-to-50%. In some examples, this ratio is in the range of 10%-to-90% to 90%-to-10%. The ratio is selected, e.g., based on conditions of one or more filters 142, outside weather conditions (e.g., temperature, humidity), and the like.

In some examples, system 100 further comprises one or more door sensors 154, positioned at each cabin door. One or more door sensors 154 are configured to determine whether each cabin door is closed or open. It should be noted that the decontamination process has different efficiencies depending on the position of the cabin doors. Furthermore, closing the doors helps to control the spread of contaminants. In some examples, the decontamination process is initiated only when all doors are closed.

One or more door sensors 154 are communicatively coupled to controller 110 and configured to provide door closure input 157 to controller 110. Controller 110 is configured to operate one or more air conditioning packs 130 and one or more fans 140 is initiated based on door closure input 157. For example, controller 110 delays this operation until all cabin doors are closed. In some examples, the process proceeds when one or more doors remain open. In some examples, operating parameters 112 of one or more air conditioning packs 130 and one or more fans 140 are further determined based on door closure input 157. For example, if one or more doors are open, then a higher combined ventilation rate is used.

Figure 3:
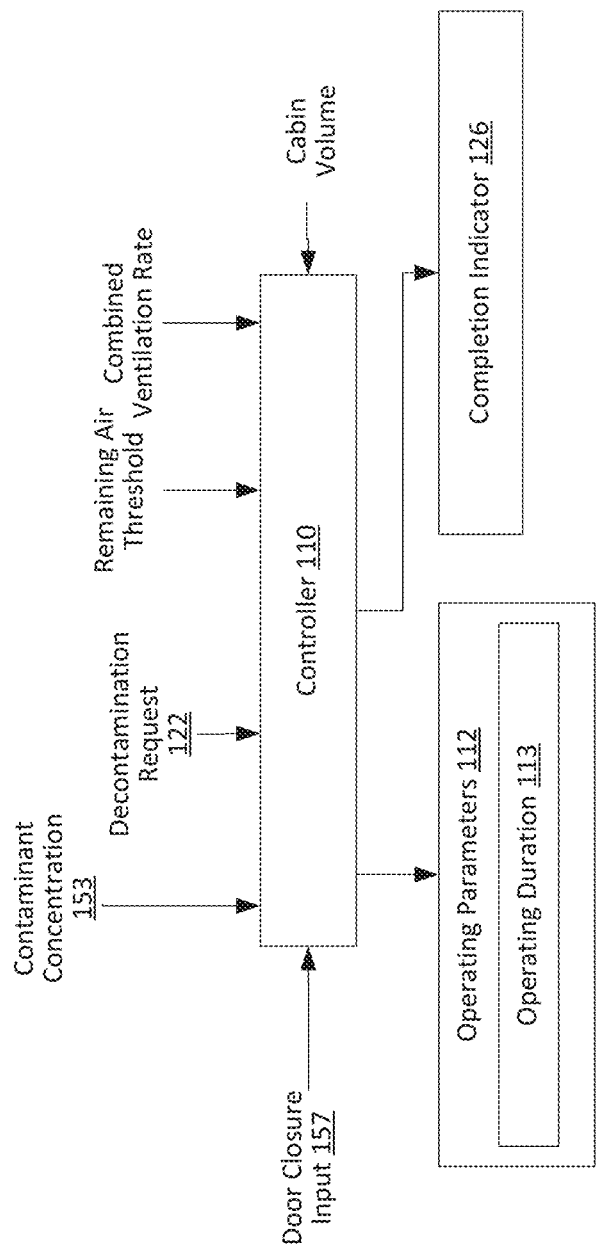
FIG. 3 is a block diagram of a controller of the system for decontaminating the aircraft cabin and providing an indication that the aircraft cabin is safe for reentry, illustrating various inputs and outputs of the controller, in accordance with some examples.

FIG. 3 illustrates various inputs and outputs to controller 110. For example, controller 110 receives (or stores) the cabin volume information, which is used for determining (e.g., calculating) operating parameters 112, such as operating duration 113. In the same or other examples, controller 110 receives (or stores) the combined ventilation rate, which is also used for determining operating parameters 112, such as operating duration 113. In the same or other examples, controller 110 receives (or stores) the remaining air threshold, which is also used for determining operating parameters 112, such as operating duration 113. Other examples of controller inputs include a decontamination request, a contaminant concentration, a door closure input. The controller used this information to determine operating parameters 112, which are passed to one or more air conditioning packs 130 and one or more fans 140 during the execution of the decontamination process. Furthermore, controller 110 generates completion indicator 126, which is passed to, e.g., indicator 128.

Decontamination Method Examples

Figure 4:
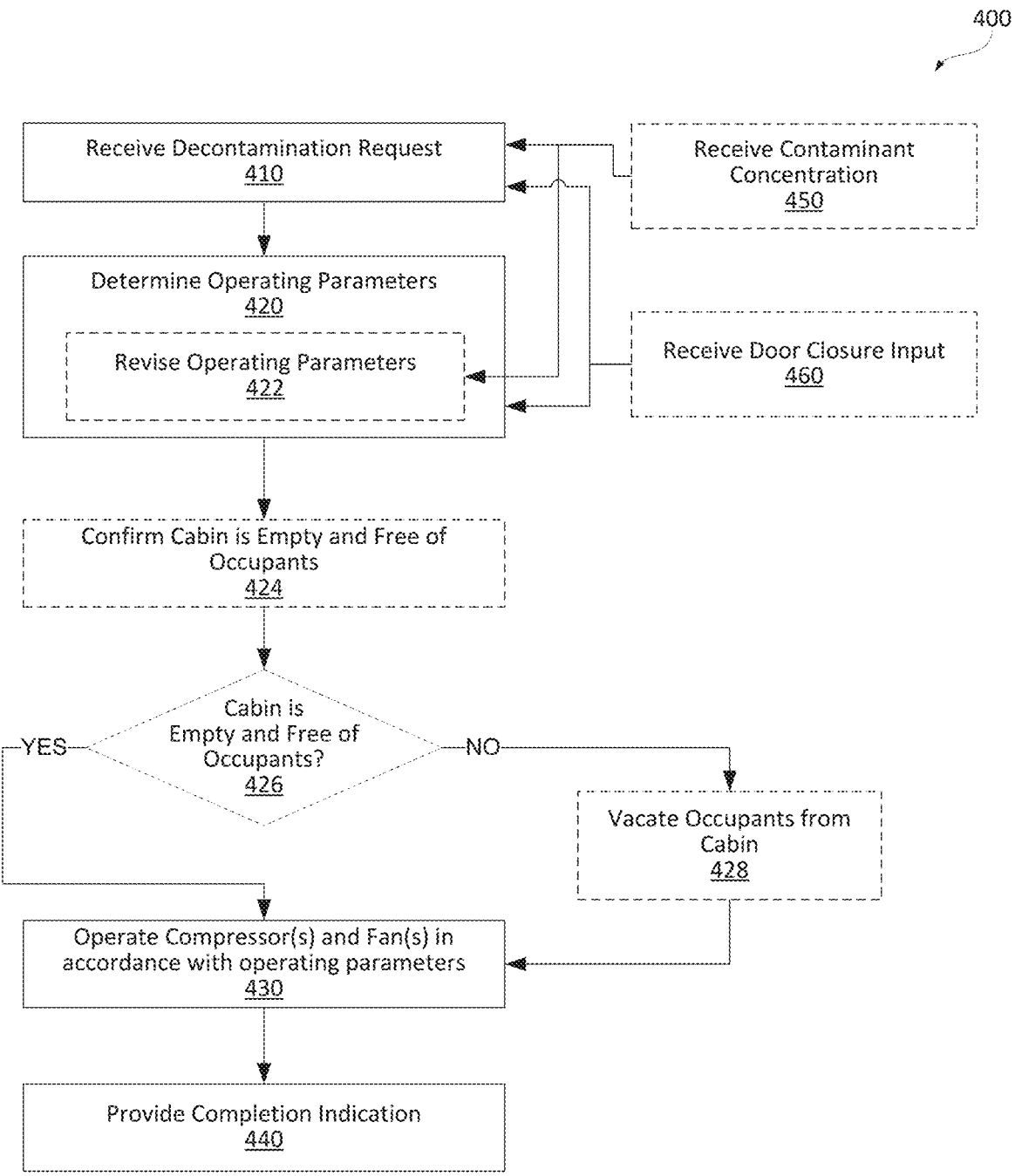
FIG. 4 is a process flowchart of a method for decontaminating the aircraft cabin and providing an indication that the aircraft cabin is safe for reentry, in accordance with some examples.

FIG. 4 is a process flowchart of method 400 for decontaminating aircraft cabin 150 and providing an indication that aircraft cabin 150 is safe for reentry, in accordance with some examples. Various operations of method 400 are performed using system 100, which is described above with reference to FIGS. 1-3.

Method 400 comprises receiving (block 410) decontamination request 122 at controller 110, For example, input device 120 sends decontamination request 122 to controller 110, e.g., based on the identification of the contamination event in aircraft cabin 150. Various examples of identifying the contamination event are within the scope, e.g., a passenger developing or reporting symptoms, receiving an external report based on a passenger manifest, receiving an input from one or more biosensors 152, and the like. For example, decontamination request 122 is received from an input device 120, communicatively coupled to controller 110, wherein input device 120 is one of a flight deck switch or an attendant panel. In another example, decontamination request 122 is received from one or more biosensors 152, positioned within cabin 150 of aircraft 190. More specifically, decontamination request 122 comprises contaminant concentration input 153, exceeding a set threshold.

Method 400 comprises determining (block 420), at controller 110, operating parameters 112 for one or more air conditioning packs 130 and for one or more fans 140 of aircraft 190. Operating parameters 112 comprise at least the operating duration of one or more air conditioning packs 130 and of one or more fans 140 and, in some example, any operating staggering conditions. Other examples of operating parameters include operating output (e.g., a ventilation rate) of each of one or more air conditioning packs 130 and each of one or more fans 140, sequence of operating one or more air conditioning packs 130 and one or more fans 140, and the like. The duration of operating one or more air conditioning packs 130 and one or more fans 140 is determined based on at least (a) the cabin volume of aircraft 190, (b) a combined ventilation rate provided by air conditioning packs 130 and one or more fans 140, and (c) a remaining air threshold in aircraft 190. The remaining air threshold reflects the concentration of the remaining contaminant in an aircraft cabin.

Figure 5:
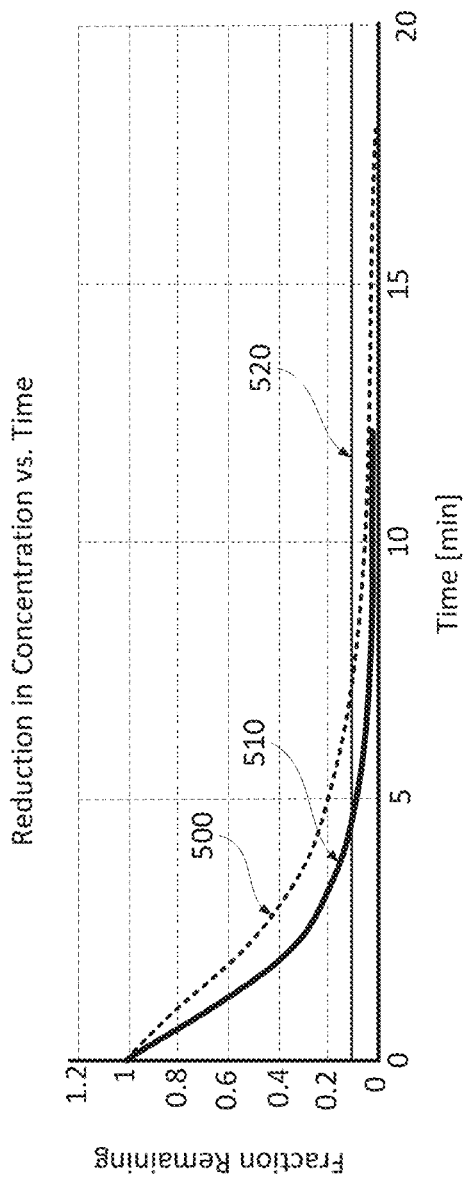
FIG. 5 illustrates plots of a remaining air fraction as a function of time for two different flow rates.

FIG. 5 illustrates plots of a remaining air fraction as a function of time for two different flow rates. Specifically, line 500 corresponds to a flow rate of 20 air changes per hour, while line 510 corresponds to a flow rate of 30 air changes per hour. Line 520 represents an example of a remaining air fraction threshold, set at 10% in this example. With a flow rate of 20 air changes per hour, the threshold is reached within about 7 minutes. With a flow rate of 30 air changes per hour, the threshold is reached within about 4 minutes. The threshold depends on the type of contaminants and other parameters.

Method 400 proceeds with operating (block 430) one or more air conditioning packs 130 and one or more fans 140 in accordance with the operating parameters thereby decontaminating cabin 150. In some examples, the operating output (e.g., a ventilation rate) of each one or more air conditioning packs 130 and each of one or more fans 140 varies while operating (block 430) one or more air conditioning packs 130 and one or more fans 140.

In some examples, the operation of one or more air conditioning packs 130 and one or more fans 140 is performed while aircraft 190 is grounded. Furthermore, in some examples, this operation is performed while aircraft 190 is empty and free of occupants (decision block 426 in FIG. 4). For purposes of this disclosure, the term "occupant" is defined as a human or animal, capable of carrying a contaminant onboard aircraft 190.

If the cabin is not empty, method 400 proceeds with vacating (block 428) the occupants from aircraft cabin 150. In some examples, method 400 further comprises confirming (block 424) that cabin 150 of aircraft 190 is empty and free of occupants before performing operating (block 430) one or more air conditioning packs 130 and one or more fans 140.

Method 400 proceeds with providing (block 440) completion indication 126 to indicator 128 upon completion decontaminating cabin 150. For example, completion indicator 128 is located outside of aircraft 190 and visible to persons outside aircraft 190. More specifically, completion indicator 128 is located on one or more of a jet bridge, a jet bay, or an airport gate. In some examples, completion indicator 128 comprises or is coupled to a wireless transmitter.

In some examples, method 400 further comprises receiving (block 450) contaminant concentration 153 in cabin 150. Contaminant concentration 153 is received at controller 110 and from one or more biosensors 152 positioned in a cabin 150 of aircraft 190. Furthermore, contaminant concentration 153 is received while operating (block 430) one or more air conditioning packs 130 and one or more fans 140. For example, one or more biosensors 152 continuously monitor the concentration of the contaminants during the decontamination process, Method 400 continues with revising (block 422) operating parameters 112 based on contaminant concentration 153 in cabin 150.

In some examples, method 400 further comprises receiving (460), at controller 110 and from one or more door sensors 154, door closure input 157, corresponding to an open-close position of each cabin door. In more specific examples, the operation of one or more air conditioning packs 130 and one or more fans 140 (block 430) is initiated or conditioned based on door closure input 157 (referring to decision block 426 in FIG. 4). In some examples, operating parameters 112 of one or more air conditioning packs 130 and one or more fans 140 are further determined based on door closure input 157.

Aircraft Examples

In some examples, methods and systems described above are used on aircraft and, more generally, by the aerospace industry. Specifically, these methods and systems can be used during the fabrication of aircraft as well as during aircraft service and maintenance.

Figure 6:
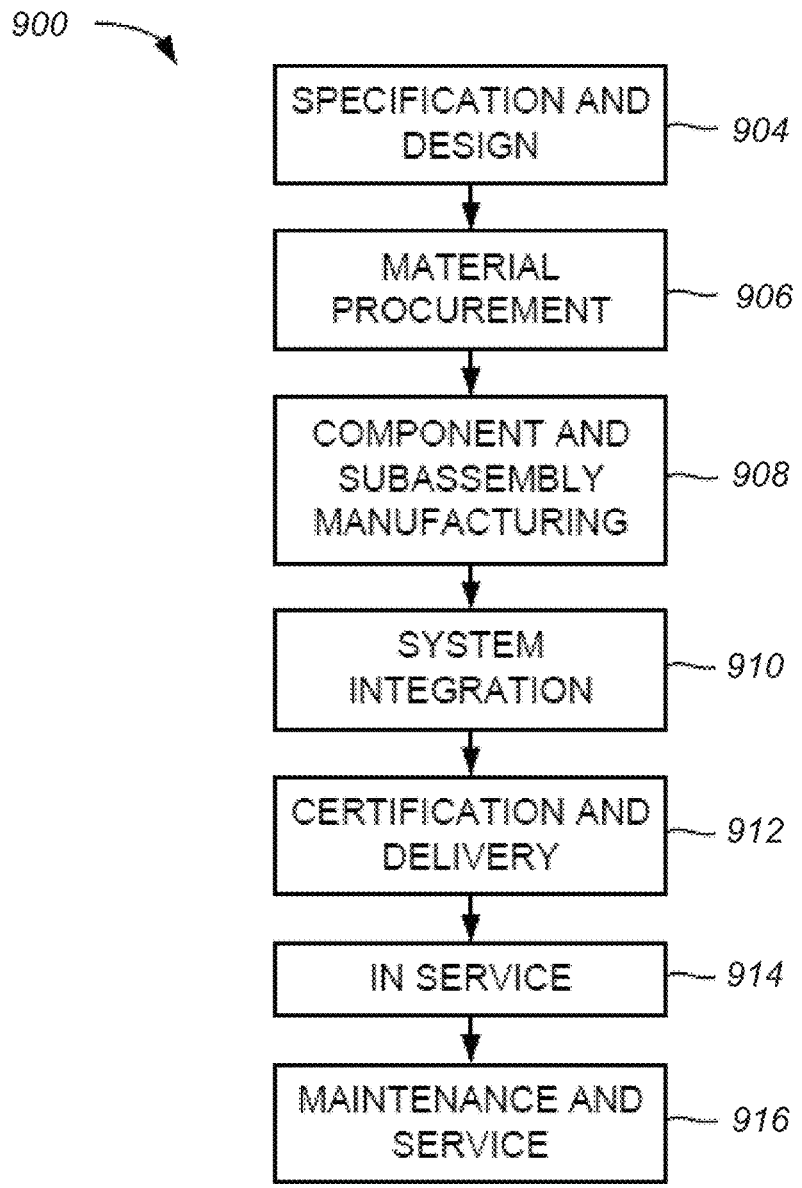
FIG. 6 is a process flowchart corresponding to a method for manufacturing and servicing the aircraft.
Figure 7:
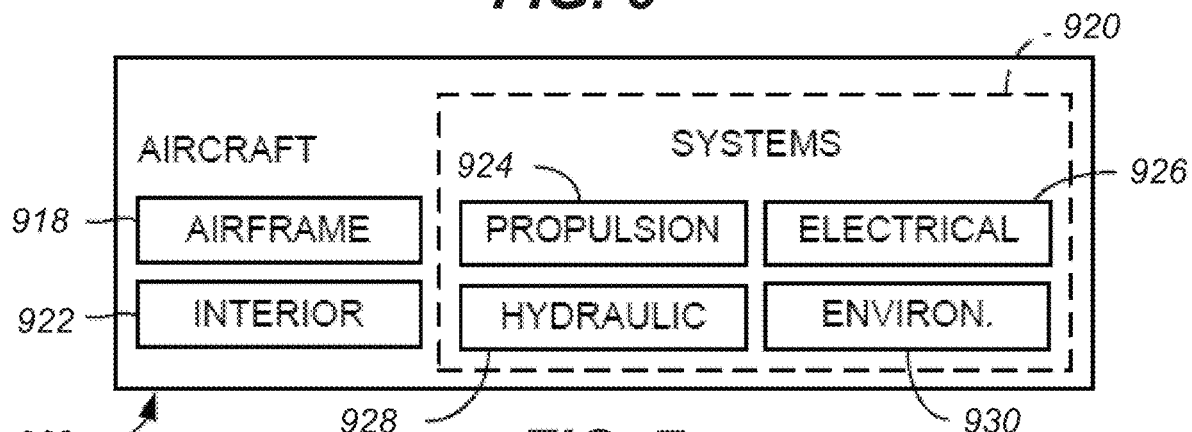
FIG. 7 illustrates a block diagram of an example aircraft, in accordance with some examples.

Accordingly, the apparatus and methods described above are applicable for aircraft manufacturing and service method 900 as shown in FIG. 6 and for aircraft 902 as shown in FIG. 7. During pre-production, method 900 includes specification and design 904 of aircraft 902 and material procurement 906. During the aircraft production, component and subassembly manufacturing 908 and system integration 910 of aircraft 902 takes place. Thereafter, aircraft 902 goes through certification and delivery 912 to be placed in service 914. While in service by a customer, aircraft 902 is scheduled for routine maintenance and service 916, which also includes modification, reconfiguration, refurbishment, and so on.

In some examples, each of the processes of method 900 is performed or carried out by a system integrator, a third party, and/or an operator, e.g., a customer. For this description, a system integrator includes without limitation any number of aircraft manufacturers and major-system subcontractors; a third party includes without limitation any number of vendors, subcontractors, and suppliers; and an operator can be an airline, leasing company, military entity, service organization, and so on.

As shown in FIG. 7, aircraft 902 produced by method 900 includes airframe 918 with plurality of systems 920 and interior 922. The airframe 918 includes wings of the aircraft 902. Examples of systems 920 include one or more propulsion system 924, electrical system 926, hydraulic system 928, and environmental system 930, Any number of other systems can be included.

Apparatus and methods presented herein can be employed during any one or more of the stages of method 900. For example, components or subassemblies corresponding to manufacturing 908 are fabricated or manufactured like components or subassemblies produced while aircraft 902 is in service. Also, one or more apparatus examples, method examples, or a combination thereof are utilized during manufacturing 908 and system integration 910, for example, by substantially expediting assembly of or reducing the cost of an aircraft 902. Similarly, one or more apparatus examples, method examples, or a combination thereof are utilized while aircraft 902 is in service, for example, and without limitation, to maintenance and service 916.

Further Examples

Further, the description includes examples according to the following clauses:

Clause 1. A method for decontaminating a cabin of an aircraft and providing an indication that the cabin is safe for reentry, the method comprising:
  receiving a decontamination request at a controller;
  determining, at the controller, operating parameters of one or more air conditioning packs and one or more fans of the aircraft,
    wherein the operating parameters comprise at least a duration of operating the one or more air conditioning packs and the one or more fans, and
    wherein the duration of operating the one or more air conditioning packs and the one or more fans is determined based on at least a cabin volume of the aircraft, a combined ventilation rate provided by the air conditioning packs and the one or more fans, and a remaining air threshold in the aircraft;
  operating the one or more air conditioning packs and the one or more fans in accordance with the operating parameters thereby decontaminating the cabin; and
  providing a completion indication to an indicator upon completion decontaminating the cabin.

Clause 2. The method of clause 1, wherein the decontamination request is received from an input device, communicatively coupled to the controller, wherein the input device is one of a flight deck switch or an attendant panel.

Clause 3. The method of any one of clause 1 or clause 2, wherein the decontamination request is received from one or more biosensors, positioned within a cabin of the aircraft.

Clause 4. The method of clause 3, wherein the decontamination request comprises a contaminant concentration input, exceeding a set threshold.

Clause 5. The method of any one of clauses 1-4, wherein the operating parameters further comprise an operating output of each of the one or more air conditioning packs and each of the one or more fans.

Clause 6. The method of clause 5, wherein the operating output of each the one or more air conditioning packs and each of the one or more fans varies while operating the one or more air conditioning packs and the one or more fans.

Clause 7. The method of any one of clauses 1-6, further comprising:
  receiving, at the controller and from one or more biosensors positioned in a cabin of the aircraft and while operating the one or more air conditioning packs and the one or more fans, contaminant concentration in the cabin; and revising the operating parameters based on the contaminant concentration in the cabin.

Clause 8. The method of any one of clauses 1-7, further comprising receiving, at the controller and from one or more door sensors, a door closure input, corresponding to an open-close position of each cabin door.

Clause 9. The method of clause 8, wherein operating the one or more air conditioning packs and the one or more fans is initiated based on the door closure input.

Clause 10. The method of clause 8, wherein the operating parameters of the one or more air conditioning packs and the one or more fans are further determined based on the door closure input.

Clause 11. The method of any one of clauses 1-10, wherein the completion indicator is located on the outside of the aircraft and visible to persons outside the aircraft.

Clause 12. The method of any one of clauses 1-11, wherein the completion indicator is located on one or more of a jet bridge, a jet bay, or an airport gate, and visible to persons outside the aircraft.

Clause 13. The method of any one of clauses 1-12, wherein the completion indicator comprises or is coupled to a wireless transmitter.

Clause 14. The method of any one of clauses 1-13, wherein at least operating the one or more air conditioning packs and the one or more fans is performed while the aircraft is grounded.

Clause 15. The method of any one of clauses 1-14, wherein at least operating the one or more air conditioning packs and the one or more fans is performed when the cabin of the aircraft is empty and free of occupants.

Clause 16. The method of any one of clauses 1-15, further comprising confirming that the cabin of the aircraft is empty and free of occupants before performing operating the one or more air conditioning packs and the one or more fans.

Clause 17. A system for decontaminating a cabin of an aircraft and providing an indication that the cabin is safe for reentry, the system comprising:
one or more air conditioning packs, configured to receive ambient air from outside the aircraft and to supply the ambient air into the cabin of the aircraft;
one or more filters;
one or more fans, configured to receive cabin air from the cabin of the aircraft, to pass the cabin air through the one or more filters thereby generating filtered air, and to supply the filtered air into the cabin;
a controller, communicatively coupled to the one or more air conditioning packs and to the one or more fans and configured to receive a decontamination request and to determine operating parameters of one or more air conditioning packs and one or more fans to perform decontamination,
wherein the operating parameters comprise duration of operating the one or more air conditioning packs and the one or more fans, and
wherein the duration of operating the one or more air conditioning packs and the one or more fans is determined based on one or more of (a) a cabin volume of the aircraft, (b) a combined ventilation rate provided by the one or more air conditioning packs and the one or more fans, and (c) an acceptable fraction of remaining air in the aircraft; and
an indicator, communicatively coupled to the controller and configured to receive completion indication from the controller and present to the completion indication to the indicator to indicate that the cabin is safe for reentry.

Clause 18. The system of clause 17, further comprising an input device, communicatively coupled to the controller and configured to send a decontamination request to the controller, wherein the input device is one of a flight deck switch or an attendant panel.

Clause 19. The system of any one of clause 17 or clause 18, further comprising one or more biosensors, positioned within the cabin of the aircraft, communicatively coupled to the controller, and configured to provide contamination concentration input to the controller.

Clause 20. The system of clause 19, wherein the controller is configured to use the contamination concentration input to trigger operation of the one or more air conditioning packs and the one or more fans.

Clause 21. The system of clause 19, wherein the controller is configured to use the contamination concentration input to revise the operating parameters of the one or more air conditioning packs and the one or more fans.

Clause 22. The system of any one of clauses 17-21, wherein the operating parameters further comprise an operating output of each of the one or more air conditioning packs and each of the one or more fans.

Clause 23. The system of any one of clauses 17-22, further comprising one or more door sensors, positioned at each cabin door, communicatively coupled to the controller, and configured to provide door closure input, corresponding to an open-close position of each cabin door, to the controller.

Clause 24. The system of clause 23, wherein the controller is configured to operate the one or more air conditioning packs and the one or more fans is initiated based on the door closure input.

Clause 25. The system of clause 23, wherein the operating parameters of the one or more air conditioning packs and the one or more fans are further determined based on the door closure input.

Clause 26. The system of any one of clauses 17-25, wherein the completion indicator is located on the outside of the aircraft 190 and visible to persons outside the aircraft.

Clause 27. The system of any one of clauses 17-26, wherein the completion indicator is located on one or more of a jet bridge, a jet bay, or an airport gate, and visible to persons outside the aircraft.

Clause 28. The system of any one of clauses 17-27, wherein the completion indicator comprises or is coupled to a wireless transmitter.

CONCLUSION

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatus. Accordingly, the present examples are to be considered illustrative and not restrictive.

What is claimed is:
1. A system for decontaminating a cabin of an aircraft and providing an indication that the cabin is safe for reentry, the system comprising:
a controller;
at least one air conditioning pack configured to receive ambient air from outside the aircraft and to supply the ambient air into the cabin of the aircraft;

at least one filter;

at least one fan, configured to receive cabin air from the cabin of the aircraft, to pass the cabin air through the at least one filter thereby generating filtered air, and to supply the filtered air into the cabin;

wherein the controller is communicatively coupled to the at least one air conditioning pack and to the at least one fan;

wherein the controller is configured a) to receive a decontamination request and b) to determine operating parameters of the at least one air conditioning pack and the at least one fan to perform the requested decontamination, wherein the controller includes operating parameters that comprise duration of operating the at least one air conditioning pack and the at least one fan; and wherein the duration of operating the at least one air conditioning pack and the at least one fan is determined by the controller based on (a) a cabin volume of the aircraft, (b) a combined ventilation rate provided by the at least one air conditioning pack and the at least one fan, and (c) an acceptable fraction of remaining contaminated air in the aircraft; and an indicator, communicatively coupled to the controller and configured to receive a completion indication from the controller, and wherein the controller communicates the completion indication to the indicator to indicate that the cabin is safe for reentry.

2. The system of claim 1, further comprising an input device, communicatively coupled to the controller and configured to send a decontamination request to the controller, wherein the input device is one of a flight deck switch or an attendant panel.

3. The system of claim 1, further comprising one or more biosensors, positioned within the cabin of the aircraft, communicatively coupled to the controller, and configured to provide contamination concentration input to the controller.

4. The system of claim 3, wherein the controller is configured to use the contamination concentration input to trigger operation of the at least one air conditioning pack and the at least one fan.

5. The system claim 3, wherein the controller is configured to use the contamination concentration input to revise the operating parameters of the at least one air conditioning pack and the at least one fan.

6. The system of claim 1, wherein the operating parameters further comprise an operating output of each of the at least one air conditioning pack and the at least one fan.

7. The system of claim 1, further comprising one or more door sensors, positioned at each cabin door, communicatively coupled to the controller, and configured to provide door closure input, corresponding to an open-door position of each cabin door, to the controller.

8. The system of claim 7, wherein the controller is configured to operate the at least one air conditioning pack and the at least one fan based on the door closure input.

9. The system of claim 7, wherein the operating parameters of the at least one air conditioning pack and the at least one fan are further determined based on the door closure input.

10. The system claim 1, wherein the indicator is located on the outside of the aircraft, and is visible to persons outside of the aircraft.

11. The system of claim 1, wherein the indicator is located on one or more of a jet bridge, a jet bay, or an airport gate, and is visible to persons outside of the aircraft.

12. The system of claim 1, wherein the indicator comprises a wireless transmitter.

13. A method of decontaminating a cabin of an aircraft and providing an indication that the cabin is safe for reentry, the method comprising:

providing a controller;

providing at least one air conditioning pack configured to receive ambient air from outside the aircraft and to supply the ambient air into the cabin of the aircraft;

providing at least one filter;

providing at least one fan, configured to receive cabin air from the cabin of the aircraft, to pass the cabin air through the at least one filter thereby generating filtered air, and to supply the filtered air into the cabin;

communicatively coupling the controller to the at least one air conditioning pack and to the at least one fan;

configuring the controller a) to receive a decontamination request and b) to determine operating parameters of the at least one air conditioning pack and the at least one fan to perform the requested decontamination, providing the controller with operating parameters that comprise duration of operating the at least one air conditioning pack and the at least one fan; and configuring the duration of operating the at least one air conditioning pack and the at least one fan to be determined by the controller based on (a) a cabin volume of the aircraft, (b) a combined ventilation rate provided by the at least one air conditioning pack and the at least one fan, and (c) an acceptable fraction of remaining contaminated air in the aircraft; and providing an indicator, and communicatively coupling the indicator to the controller and configuring the indicator to receive a completion indication from the controller, and causing the controller to communicate the completion indication to the indicator to indicate that the cabin is safe for reentry.

14. The method of claim 13, wherein the decontamination request is received from at least one biosensor positioned within the cabin.

15. The method of claim 13, wherein the decontamination request is received from an input device, communicatively coupled to the controller, and wherein the input device is one of a flight deck switch or an attendant panel.

16. The method of claim 13, wherein the decontamination request comprises a contaminant concentration input that exceeds a set threshold.

17. The method of claim 13, wherein the completion indicator is located on the outside of the aircraft and visible to persons outside of the aircraft.

18. The method of claim 13, further comprising receiving, at the controller and from one or more door sensors, a door closure input, corresponding to an open-close position of each cabin door.

19. The method of claim 18, wherein operating the at least one air conditioning pack and the at least one fan is initiated based on the door closure input.

20. A method of decontaminating a cabin of an aircraft and providing an indication that the cabin is safe for reentry, the method comprising:

providing a controller;

providing at least one air conditioning pack configured to receive ambient air from outside the aircraft and to supply the ambient air into the cabin of the aircraft;

providing at least one filter;

providing at least one fan, configured to receive cabin air from the cabin of the aircraft, to pass the cabin air through the at least one filter thereby generating filtered air, and to supply the filtered air into the cabin;

communicatively coupling the controller to the at least one air conditioning pack and to the at least one fan;

configuring the controller a) to receive a decontamination request and b) to determine operating parameters of the at least one air conditioning pack and the at least one fan to perform the requested decontamination, providing the controller with operating parameters that comprise duration of operating the at least one air conditioning pack and the at least one fan; and configuring the duration of operating the at least one air conditioning pack and the at least one fan to be determined by the controller based on (a) a cabin volume of the aircraft, (b) a combined ventilation rate provided by the at least one air conditioning pack and the at least one fan, and (c) an acceptable fraction of remaining contaminated air in the aircraft; and providing an indicator, and communicatively coupling the indicator to the controller and configuring the indicator to receive a completion indication from the controller, causing the controller to communicate the completion indication to the indicator to indicate that the cabin is safe for reentry; and wherein at least one biosensor continuously monitors concentration of contaminants during the requested decontamination.

\* \* \* \* \*